United States Patent [19]

Gaffney

[11] 3,961,168

[45] June 1, 1976

[54] COMPUTER WITH MANUAL PARAMETER ENTRY MEANS

[75] Inventor: Thomas David Gaffney, Dundalk, Ireland

[73] Assignee: Oeleq Limited, Dundalk, Ireland

[22] Filed: Dec. 4, 1974

[21] Appl. No.: 529,635

[52] U.S. Cl. ............................. 235/152; 235/150.1; 340/172.5
[51] Int. Cl.² ..................... G06F 3/02; G06F 15/46
[58] Field of Search .................. 235/152, 150.1; 340/172.5

[56] References Cited
UNITED STATES PATENTS

| | | | |
|---|---|---|---|
| 3,324,458 | 6/1967 | MacArthur | 340/172.5 |
| 3,505,512 | 4/1970 | Fricke, Jr. et al. | 235/150.1 X |
| 3,532,862 | 10/1970 | Dahlin | 235/150.1 X |
| 3,543,010 | 11/1970 | Dahlin | 235/150.1 X |
| 3,602,701 | 9/1971 | Boyd, Jr. | 235/150.1 |
| 3,770,946 | 11/1973 | Fertik et al. | 235/150.1 |
| 3,863,060 | 1/1975 | Rode et al. | 235/156 |

*Primary Examiner*—David H. Malzahn
*Attorney, Agent, or Firm*—Mason, Fenwick & Lawrence

[57] ABSTRACT

A computing system is disclosed which operates using a digital computer which is programmed with a known programme, and information is fed into the computer from an input unit which incorporates a means to apply specific values for the initial conditions of selected variables and further means which are manually actuable to vary the value of the quantity representing a designated variable from its initial condition during computation in order that the response to such variation may be monitored on a display unit which conveniently is in the form of a video display unit. Additionally monitoring means in the form of lights which are operable in response to constraint violation may be included. The manually actuable means is disclosed in a form which is electronic.

3 Claims, 6 Drawing Figures

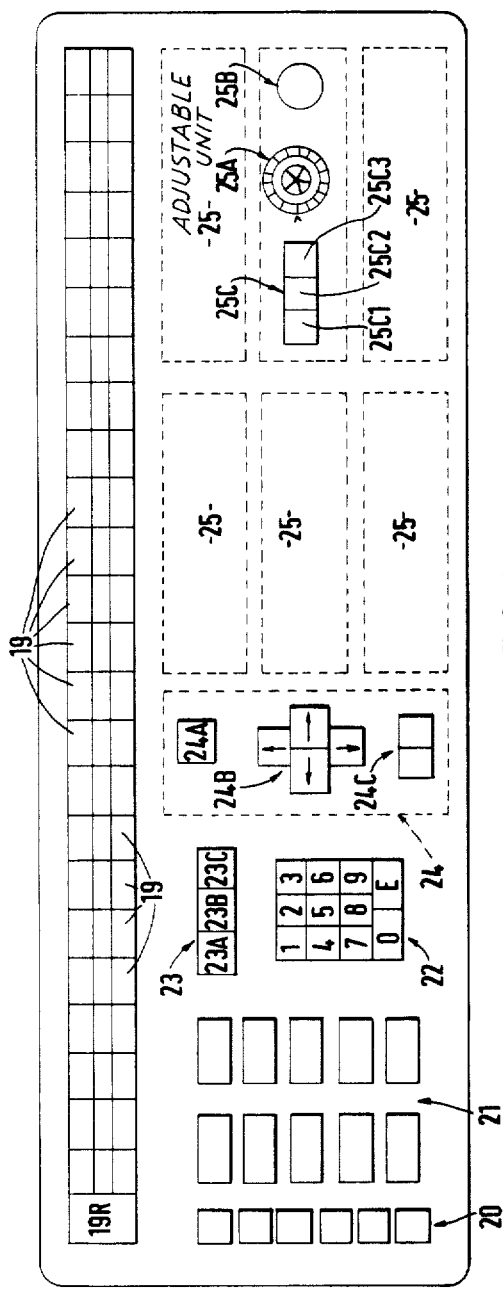
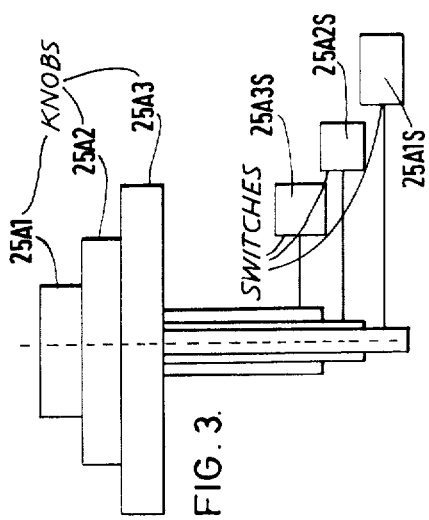
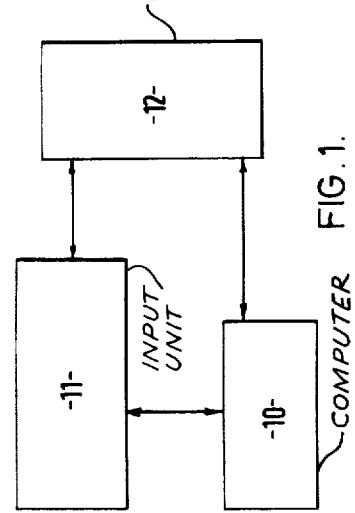

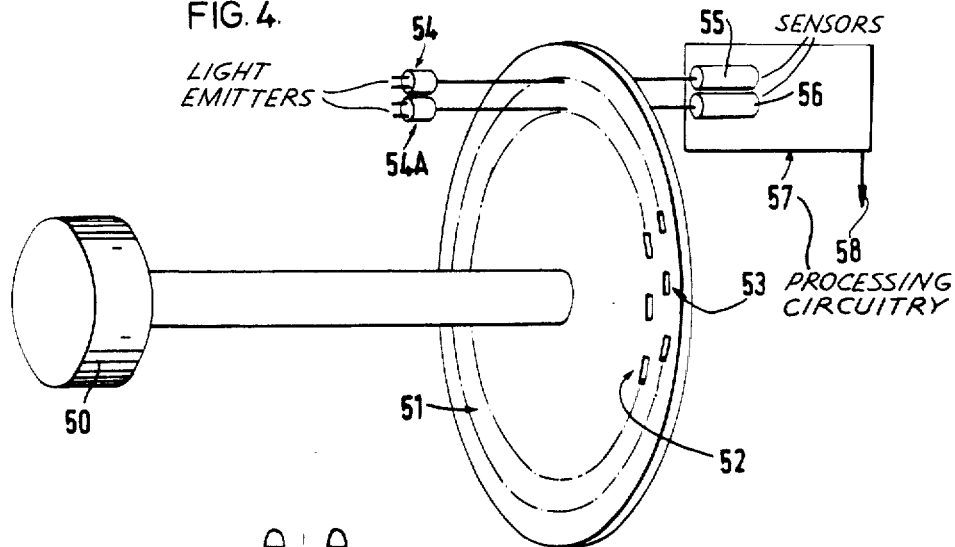
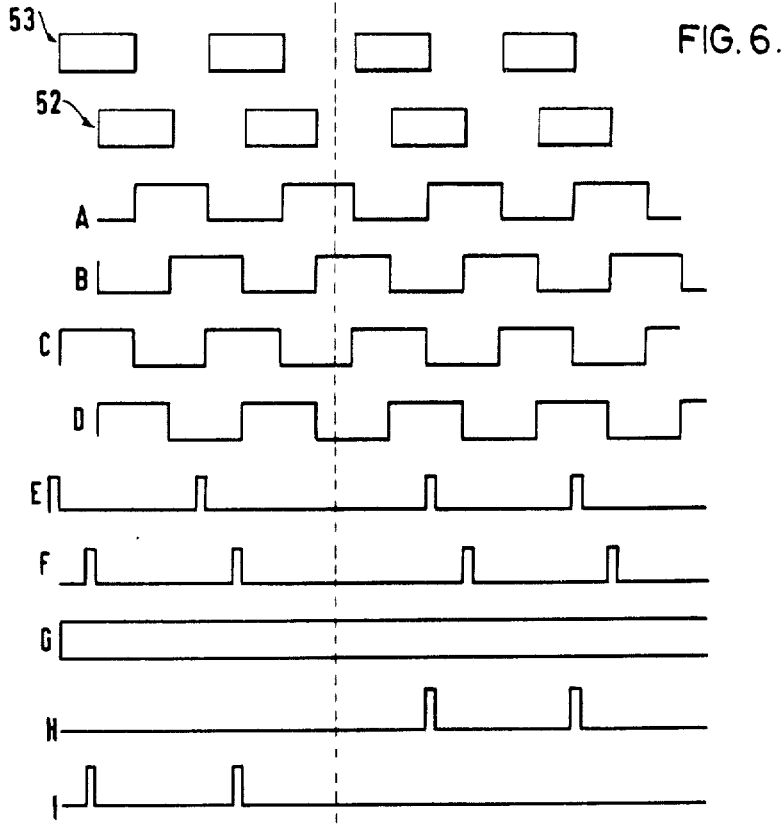

COMPUTER WITH MANUAL PARAMETER ENTRY MEANS

This invention relates to a computing system either of the digital or analogue or hybrid type, and is related to co-pending application Ser. No. 529,636 filed Dec. 4, 1974, by Wilfred Norman Blackwood, Finbar Joseph Gallagher, Kenneth Rutherford Richey and William Marshall for "Improvements in or relating to computer systems". The disclosure of said co-pending application is imported herein in its entirety.

According to the present invention there is provided a computing system having a computing section adapted to compute according to a predetermined programme, an input unit coupled to feed information into said computing section and a display unit coupled to said computing section to display information contained therein, and wherein said input unit includes means to apply to said computing section quantities representative of the initial conditions of variables of said information, and manually-actuable means adapted to vary the value of the quantity representing a designated variable from its initial condition, said manually-actuable means comprising a manually rotatable element arranged to operate electronic circuitry to generate a train of pulses to vary said value.

The computing section may form part of a digital computer in which case said input unit is adapted to input said predetermined programme and to amend this programme as required by the user.

Preferably the manually actuable means is adapted to adjust a designated variable from its initial condition incrementally or decrementally in a manner which appears continuous to the user.

An embodiment of the present invention will now be described by way of example with reference to the accompanying drawings, in which:

FIG. 1 diagrammatically shows a computing system according to the present invention;

FIG. 2 shows one form of the input unit of FIG. 1;

FIG. 3 illustrates an addressing unit of FIG. 2; and

FIG. 4 illustrates an adjustment unit of FIG. 1;

FIG. 6 illustrates waveforms of the circuit of FIG. 5.

Figure 5:
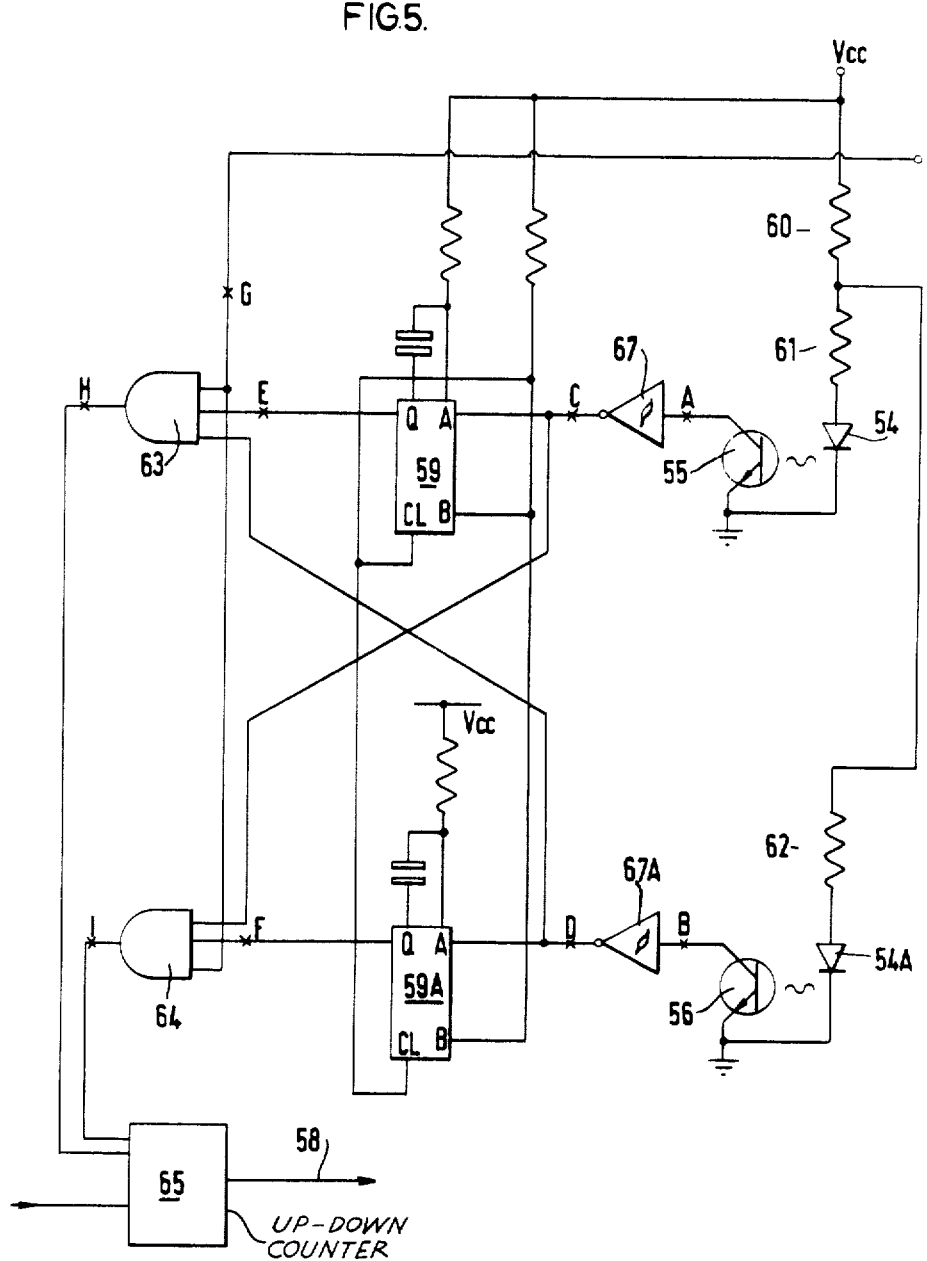
FIG. 5 illustrates the electrical circuit connected to the unit of FIG. 4.

The computing system illustrated in the drawings comprises a computing section or computer 10 which may be either analogue or digital, or a combination of both (i.e. hybred), and which is arranged to exchange information with an input 11. A video display unit 12 is coupled to the computer 10 and to the input unit 11 for display purposes. The video display 12 includes a cursor which may be programmed to move sequentially from position to position on the display or may be programmed for separate position control.

One form of the input unit 11, illustrated in part in FIG. 2, comprises a plurality of switches 19, a bank of six limit lights 20, a group of display-summoning keys 21, a numeric element 22, a numeric addressing element 23, a cursor positioning device 24 for controlling the location of the position-indicating cursor of the video display unit 12 which is separate from the unit 11, and a group of six manually-actuable means 25 which may be used in a manner to be described to vary the value of a designated variable of a problem undergoing solution within the computer 10 when loaded with a predetermined programme. The unit 11 also includes an 'alpha' section (not shown) incorporating an alphabetical keyboard and means for accepting a predetermined computer programme and for loading that programme into the computer 10. The programme is tailored to respond to designated signals from respective ones of the keys 21 to output a dedicated sub-programme for display on the unit 12 and likewise the limit lights 20 are responsive to the occurrence of predetermined conditions within the programme and in this sense act as a monitoring means for the problem under computation.

In a specific example, the computer programme is one which assesses financial condition or performance of a company or other concern. Briefly, the programme, which is known per se, is such as to provide a dynamic model of the financial condition or performance of the concern under investigation at the end of successive intervals of simulated time and consequently the information computed by the computer 10 is displayed on the display unit 12 in an accepted accountancy presentation, namely, Balance Sheets, Profit and Loss Accounts, Sales Figures, Purchase Figures, credit ratios, Loan capital, Interest charges, credit terms and the like as determined by respective ones of the keys 21. Reference may be had to British Patent Specification No. 1,355,511 which describes this problem in detail and which illustrates one form of accepted accountancy presentation. Thus, in FIG. 2, the keys 21 each provide for a particular predetermined format to be displayed on the display unit 12. For example, the format could be a Balance Sheet with suitable headings, the numerical data being determined as described hereinafter.

The switches 19, which conveniently may be 24 in number select the simulated time period over which the computer 10 is to operate to provide the financial standing depicted on the display unit 12, and require to be manually set. If a single switch 19 is depressed to the "ON" position the computer 10 calculates the financial standing or performance of the company at the end of that period. If two switches 19 are depressed to the ON position the computer 10 will calculate the financial performance of the company at the end of the period denoted by the switch 19 which is furthest to the right taken from the standing of the company at the time denoted by the switch 19 which is furthest to the left. The switches 19 may be cancelled at any time by use of a 'reset' switch 19R. Conveniently the switches 19 are of the paddle action type with an ON position and a 'LOCKED ON' position on opposite sides of the centre or 'OFF' position. This permits selected switches 19 to be locked on for reference purposes. The reset switch 19R only cancels switches in the ON position.

The numerical addressing element 23 in combination with the numeric element 22 and the cursor positioning element 24 is programmed to call up values of the problem variables at an identifiable location on the displayed format from information contained in stores within the computer 10. The element 23 contains three keys 23A, 23B, 23C respectively labelled 'Line', 'Period', 'Initial' and the programme is arranged to respond to operation of the Line key 23A followed by a numerical combination from the element 22 to permit the operator to gain access to information stored within the computer 10 concerning the particular production line which is dedicated to the specific numerical combination utilised. Operation of the Period key 23B followed by a numerical combination from the element 22 permits the operator to select information stored within the computer 10 concerning a particular time period for the previously selected production line. If period code zero is used the displayed format is displayed without numerical data. Subsequent operation of the Initial key 23C followed by location of the video display cursor at a particular address allows a particular numerical combination from the element 22 to be entered into the particular address as the specific initial condition or value representative of the variable concerned. Information already entered on the display may be changed by locating the cursor beneath the existing data in the desired location, the new numerical data is dialled into the element 22 and entered into the display and hence into the appropriate store of the computer 10 by use of the 'E' key of the element 22. The cursor of the video display unit 12 is moved from its 'home' position and positioned below the value to be altered, using the device 24, which has a key 24A to move the cursor direct to its home position, other keys 24B to index the cursor in any direction from a previous position, and other keys 24C to move the cursor rapidly either up or down the page of visual display.

The limit lights 20 which for example could represent Minimum Current Ratio, Minimum Profit to Capital Ratio; Maximum Creditors to Debtors Ratio; Minimum Profit to Sales Ratio; Minimum Stock; and Maximum Overdraft are operated by the computer 10 when respective ones of these constraints have been violated in achieving the displayed financial standing of the company. Predetermined settings of these constraints are entered into stores of the computer 10 by the initial programme and these settings may be varied by utilising the alpha section of the unit 11 to gain access to the appropriate stored information and thereafter utilising the numeric element 22 and the cursor positioning device 24.

The manually-actuable means 25 of the present invention in this embodiment, comprise three separate elements, an addressing unit 25A, an adjustment unit 25B and a control unit 25C. The purpose of the means 25 is to enable the operator to adjust or 'tune' values of variables from their initial condition, while at the same time visually monitoring the effect on the computation on the video display unit 12 and also by means of the lights 20. The addressing unit 25A is preferably a triple concentric switch as illustrated in FIG. 3 although it could alternatively be in the form of three push-button numeric elements operating magnetic switches. In FIG. 3 the smallest knob 25A1 is arranged to actuate a set of switches 25A1S which direct signals to the computer 10 and which are received by the computer 10 in accordance with the predetermined programme as designating the various activities of the company (such as 'sales', 'purchases', and the like). The knob 25A2 is arranged to actuate a further set of switches 25A2S which direct signals to the computer 10 and which the computer 10 receives in accordance with the predetermined programme as designating the various product lines of the company. The largest knob 25A3 is arranged to actuate a still further set of switches 25A3S which direct signals to the computer 10 and which the computer 10 receives in accordance with the predetermined programme as designating the various time periods over which the computer can operate. Having dialled a particular address on the unit 25A to gain access to the value of a specific variable in a specific period of simulated time in respect of a particular product line the operator can vary the value of that variable incrementally or decrementally from its value pre-set by the elements 22 and 23 described above by use of the unit 25B in combination with the unit 25C. The unit 25B may consist of a simple potentiometer wound linearly or logarithmically having a constant applied voltage so that the output from the unit 25B is dependent upon the angular movement of the knob. The unit 25C incorporates three separate keys; 25C1 which acts as a 'scan' control to cause the computer 10 temporarily to accept the value of the designated variable dictated by the unit 25B and to compute the financial position or performance of the company therefrom; 25C2 which when actuated subsequent to the key 25C1 causes the altered value of the designated variable to be permanently entered in substitution for that previously held in the store of the computer 10; and 25C3 which when operated as an alternative to key 25C2 causes the computer 10 to revert back to the previously stored value of the designated variable.

Although the unit 25B may consist of a simple potentiometer it is preferred to utilise the arrangement of FIGS. 4 and 5. In FIG. 4 the unit 25B comprises a knob 50 mounted on a shaft which carries an apertured disc 51. The apertures in the disc 51 are arcuate slots arranged in two adjacent rows 52,53 near the periphery of the disc with the apertures of row 52 staggered in relation to those of row 53. A pair of light emitting elements 54,54A are arranged to direct their respective light beams through the paths traversed by the aperture rows 52,53 for intermittent receipt by sensors 55,56 which form part of processing circuitry 57 to provide on an output line 58 incremental or decremental signals for a designated variable in the manner previously described.

The light-emitting elements 54,54A and the circuitry 57 is shown in detail in FIG. 5 and comprises a resistor chain 60,61,62 feeding the elements 54,54A which are in the form of light emitting diodes from a d.c. voltage source Vcc. The sensors 55,56 are in the form of photo-transistors and depending upon the presence or absence of light incident thereon have their collectors (points A and B) either saturated or cut-off. The waveforms at points A and B are illustrated in FIG. 6 as a function of continuously varying angular displacement of the disc 51 from a datum position.

The waveform at points A and B are inverted by Schmitt Trigger Inverters 67,67A to provide the waveforms at points C and D and these waveforms are further processed by monostable multivibrators 59,59A to provide the illustrated waveforms at points E and F. Waveforms E and D are applied to an AND gate 63 and waveforms C and F are applied to an AND gate 64, both of which gates 63,64 receive an 'enable' waveform as illustrated in FIG. 6 at G (and which may be generated by a bistable device (not shown)). Only when all these voltages to one gate are at their high level is an output generated and a consideration of the waveforms of FIG. 6 will show that for positive angular displacement of the disc 51 from a datum position output pulses will appear only on line H but for negative angular displacement of the disc 51 from a datum position output pulses will appear only on line I. The pulses on line I or H form the inputs to the 'up' line of an up-down counter 65 the other input of which is the initial value of the selected or designated variable and the output of the counter 65 is fed back to the computer 10 on the line 58. Thus on initial addressing of the means 25 to a specific variable the initial value of that variable appears to the operator to be under the control of the knob 50 and on rotating the knob 50 in a clockwise direction the value is incremented by an amount which is directly proportional to the physical amount of movement of the knob 50 and likewise when the knob 50 is moved anticlockwise the value is decremented by an amount which is directly proportional to the physical amount of movement of the knob.

In the described embodiment a single video display output device has been described but it will of course be understood that a plurality of such devices could be incorporated in the display means, said devices being dedicated, for example, to display different aspects of the company's financial position or standing. Also, the input unit may comprise or utilise a video display input device. For example, a video display device arranged to accept information manually applied thereto in alphanumeric or graphic form on the screen, this information being fed to the computing section and being operated thereon by the predetermined programme. The graphical form of information could comprise a histogram of information.

Although the programme described above relates to the financial standing of a company other programmes may operate with equal facility utilising the above-described apparatus. For example, the switches 19 might be programmed as being representative of a set of products involved in a factory scheduling problem. Activating a particular switch 19 might for example, call for a pre-set requirement for the associated product to be included in the model under computation. Alternatively the switches 19 might be used in a feed formulation problem in which case the action of a switch might represent the offering of the specification of a particular ingredient to the formulation under computation by the computer. As a further alternative the switches 19 could be used as programme select switches for accessing particular sub-routines in the programme.

By virtue of the present invention, and in particular due to the provision of the means 25 described in the embodiment, an operator of the system described is provided with a computer system which exhibits the characteristics as normally understood of an analogue computer model in that by variation of one or more designated variables the effect upon the computer model and its implications to the operator can be evaluated dynamically. Consequently, although six means 25 have been described any suitable number thereof may be accommodated.

What is claimed is:

1. A computing system having a computing section for computing according to a predetermined programme, an input unit coupled to feed information into said computing section and a display unit coupled to said computing section to display information contained therein, and wherein said input unit includes means to apply to said computing section quantities representative of the initial conditions of variables of said information, manually-actuable means for varying the value of the quantity representing a designated variable from its initial condition, electronic circuitry for generating a train of pulses, said manually-actuable means comprising a manually rotatable element arranged to operate said electronic circuitry to generate a train of pulses to vary said value, and an up/down counter arranged to receive said train of pulses and the value of said designated variable and to output an altered value thereof.

2. A computing system according to claim 1 wherein said input unit includes monitoring means responsive to the occurrence of predetermined conditions within said computing section.

3. A computing system according to claim 2, wherein said monitoring means includes a plurality of lights.

* * * * *

UNITED STATES PATENT AND TRADEMARK OFFICE
CERTIFICATE OF CORRECTION

PATENT NO. : 3,961,168
DATED : June 1, 1976
INVENTOR(S) : Thomas D. Gaffney

It is certified that error appears in the above-identified patent and that said Letters Patent are hereby corrected as shown below:

The spelling of the Assignee should be --Qeleq--.

Signed and Sealed this

Twelfth Day of October 1976

[SEAL]

Attest:

RUTH C. MASON
Attesting Officer

C. MARSHALL DANN
Commissioner of Patents and Trademarks